United States Patent [19]

Scobbie

[11] Patent Number: 5,381,890

[45] Date of Patent: Jan. 17, 1995

[54] CONVERTIBLE PACKAGE/SHELF ORGANIZER

[75] Inventor: Gavin Scobbie, Homewood, Ill.

[73] Assignee: R. R. Donnelley & Sons Co., Lisle, Ill.

[21] Appl. No.: 134,743

[22] Filed: Oct. 12, 1993

[51] Int. Cl.6 .................................................... B65D 5/52
[52] U.S. Cl. ............................ 206/45.23; 206/45.13; 206/45.15; 229/103
[58] Field of Search ................ 206/44 B, 45.13, 45.15, 206/45.17, 45.2, 45.21, 45.23; 229/103

[56] References Cited

U.S. PATENT DOCUMENTS

| | | | |
|---|---|---|---|
| 2,146,421 | 2/1939 | Davidson | 206/45.15 |
| 2,414,671 | 1/1947 | Rosenthal | 206/45.23 |
| 2,647,621 | 8/1953 | Bowden | 229/103 |
| 3,133,632 | 5/1964 | Goldstein . | |
| 3,583,783 | 6/1971 | Murphy et al. . | |
| 3,881,598 | 5/1975 | Schwimmer . | |
| 4,674,632 | 6/1987 | Friedman . | |
| 4,697,704 | 10/1987 | Curry . | |
| 4,700,831 | 10/1987 | Kassai . | |
| 4,896,766 | 1/1990 | Paley | 206/45.15 |
| 4,955,469 | 9/1990 | Hudspith | 206/45.23 |

Primary Examiner—David T. Fidei
Attorney, Agent, or Firm—Wood, Phillips, VanSanten, Hoffman & Ertel

[57] ABSTRACT

In order to sell a multi-media product such as documentation and software in an effective yet unique manner, a convertible package/shelf organizer is provided. The convertible package/shelf organizer comprises a generally rectangular box having a top wall, a bottom wall, a front wall, a back wall, and a pair of side walls defining an enclosure for shipping the contents of the box in a normal protected-product fashion. The front wall of the box is in the form of a cover hinged to one of the top and bottom walls and is movable from a closed position concealing and protecting the contents of the box during shipment to an open position providing access for removal of the contents of the box after shipment. The convertible package/shelf organizer is also such that the cover is moveable to a position within the enclosure juxtaposed against an inner surface of the one of the top and bottom walls to which it is hinged and also against the rear wall when the contents of the box have been removed therefrom. In addition, the convertible package/self organizer is such that the cover can be locked in a position to accommodate replacement of the contents of the box for visibly displaying them in shelf organizer fashion therewithin.

16 Claims, 2 Drawing Sheets

CONVERTIBLE PACKAGE/SHELF ORGANIZER

FIELD OF THE INVENTION

The present invention is generally directed to the field of packaging for products and, still more particularly, a convertible package/shelf organizer for multi-media products such as documentation and software.

BACKGROUND OF THE INVENTION

Over the years, the field of packaging for products has evolved with the products that are to be sold therewithin. It is generally known that packaging of all types has become much more sophisticated in recent years to not only provide effective packaging for shipping purposes but also packaging which actually serves to assist in the successful marketing of the product itself. In fact, the field of packaging has reached a level of sophistication that is regarded as having great marketing significance.

More specifically, the packaging for a product is known to be a key factor in the overall product marketing effort. The fact is that consumers are inundated with such a proliferation of different products and packages that there is great competition among companies to attract initial attention of consumers by reason of their packaging, particularly in the normal setting of a retail store. In many cases, this can spell the difference between success and failure regardless of the quality of a product.

Still additionally, it is nonetheless the case that the conventional requirements for packaging must be successfully achieved. This means that the packaging must be protective of the contents both during shipping and on the store shelf and even afterwards. In the case of software and documentation, there are still other requirements that would be desirable to achieve.

Specifically, it is known to be important for the diskettes and documentation to be adequately protected at all times. This includes not only during shipment and store display but also subsequent protection once the product has been purchased by the consumer. For this purpose, it would be desirable to provide a package that is convertible into a shelf organizer.

The present invention is directed to overcoming one or more of the foregoing problems and achieving one or more of the resulting objects.

SUMMARY OF THE INVENTION

It is therefore a principal object of the present invention to provide unique packaging in the form of a convertible package/shelf organizer. It is a further object of the present invention to provide such a package for multi-media products and the like such as software and documentation where these items are protected during shipment and on the store shelf and are later protected after purchased by the consumer in shelf organizer fashion. It is an additional object of the present invention to provide a cover for a package that is moveable to allow the contents to be visibly displayed.

Accordingly, the present invention is directed to unique packaging in the form of a convertible package/shelf organizer comprising a generally rectangular box which is particularly well-suited for products such as documentation and software. The box has a top wall, a bottom wall, a front wall, a back wall, and a pair of sidewalls defining an enclosure for shipping the contents of the box in a normal protected-product fashion.

The front wall of the box comprises a cover hinged to one of the top and bottom walls and movable from a closed position concealing and protecting the contents of the box during shipment to an open position providing access for removal of the contents of the box after shipment. The cover is moveable to a position within the enclosure juxtaposed against an inner surface of one of the top and bottom walls to which it is hinged and also against the rear wall when the contents of the box has been removed. With this arrangement, the convertible package/shelf organizer also includes means for locking the cover in the juxtaposed position to accommodate replacement of the contents such that they are visibly displayed in shelf organizer fashion within the box.

In the preferred embodiment, the cover is hinged to the top wall of the box and is of a height greater than the depth of the top wall of the box to define a tuck-in flap. It also preferably includes a fold line parallel to an axis about which the cover is hinged to further define the tuck-in flap together with a pair of side flaps hinged to the cover adjacent the side walls of the box. In this connection, the locking means advantageously comprises the side flaps in cooperation with respective side flap receiving openings in the sidewalls of the box.

In the exemplary embodiment, the cover includes a first portion hinged to and generally equal in size to the top wall of the box and a second portion defining the tuck-in flap. With this arrangement, the second portion of the cover is advantageously hinged to the first portion of the cover and is formed generally equal in size to the back wall of the box.

Preferably, at least the side walls each include an outer wall portion and an inner wall portion with the flap receiving opening being formed in the inner wall portion. The side flaps hinged to the cover may then be inserted into the respective flap receiving openings, i.e., they may be inserted into the opening between the inner and outer wall portions of the side walls. In this connection, the inner wall portion of each of the side walls is advantageously integral with the outer wall portion at a fold line adjacent one of the sides of the cover.

In a preferred embodiment, the inner wall portion of each of the side walls has a generally rectangular cut-out located adjacent the top and back walls of the box so as to be generally L-shaped. The inner and outer wall portions of each of the side walls are then preferably disposed in adjoining relation such that the cut-out defines the flap receiving opening. Additionally, the side flaps on the cover are each advantageously sized so as to be lockingly received within one of the flap receiving openings defined by the generally rectangular cut-outs.

Other objects, advantages and features of the present invention will become apparent from a consideration of the following specification taken in conjunction with the accompanying drawings.

DETAILED DESCRIPTION OF THE PREFERRED EMBODIMENT

Figure 1:
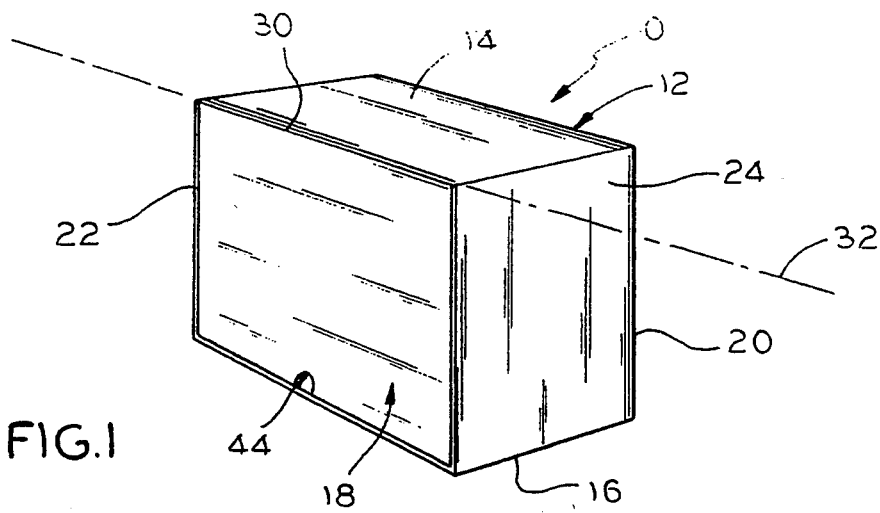
FIG. 1 is a perspective view of a convertible package/shelf organizer in accordance with the present invention.

In the illustrations given, and with reference first to FIG. 1, the reference numeral 10 designates unique packaging generally in the form of a convertible package/shelf organizer in accordance with the present invention. The package/organizer 10 comprises a generally rectangular box 12 having a top wall 14, a bottom wall 16, a front wall 18, a back wall 20, and a pair of side walls 22 and 24 defining an enclosure 26 (see FIG. 2) for shipping the contents of the box in a normal protected-product fashion (see FIG. 4). The front wall 18 of the box 12 comprises a cover hinged to one of the top and bottom walls 14 and 16, preferably the top wall 14, and moveable from a closed position concealing and protecting the contents of the box during shipment (see FIG. 1) to an open position providing access for removal of the contents of the box after shipment (see FIG. 2). The cover 18 is then moveable within the enclosure 26 (see FIG. 3) until it is juxtaposed against an inner surface of the one of the top and bottom walls 14 and 16, again preferably the top wall 14, and against the rear wall 20 when the contents of the box have been removed (see FIG. 4). Still additionally, the convertible package/shelf organizer 10 includes means for locking the cover 18 in the juxtaposed position to accommodate replacement of the contents of the box 12 into the box 12 such that the contents are visibly displayed in shelf organizer fashion therwithin (see FIG. 5).

Figure 2:
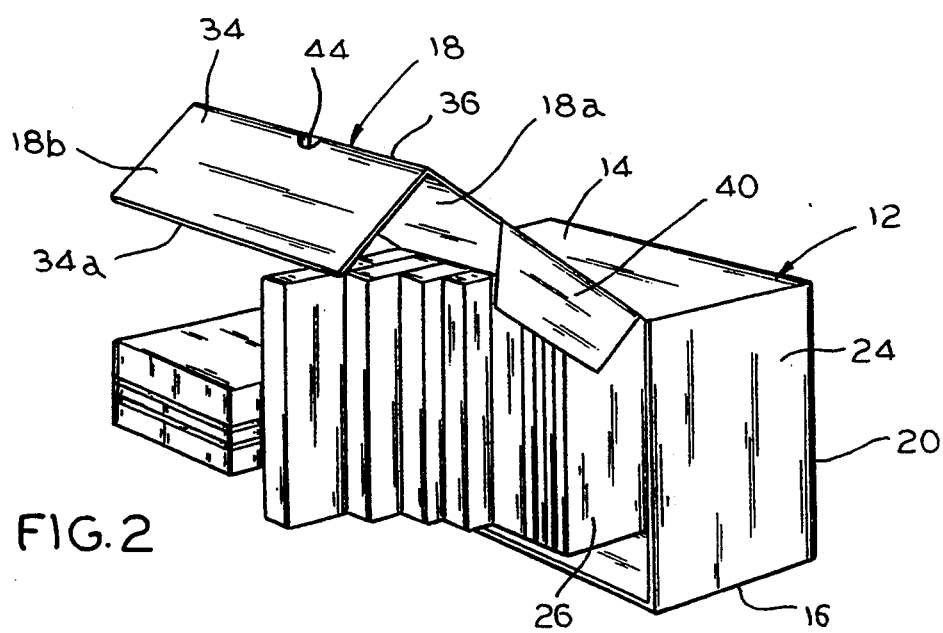
FIG. 2 is a perspective view of the package/shelf organizer of FIG. 1 with the cover opened for removal of the contents.

As suggested above, the cover 18 is preferably hinged to the top wall 14 of the box 12 generally about a fold line 30 extending along an axis 32, and it is of a height greater than the depth of the top wall 14 of the box 12 to define a tuck-in flap 34 (see FIGS. 1 and 2). It will also be seen and appreciated from FIG. 3 that the tuck-in flap 34 is defined by a fold line 36 which extends parallel to the fold line 30 and the axis 32 about which the cover 18 is hinged, and the cover 18 further includes a pair of side flaps 38 and 40 hinged to the cover 18 adjacent the side walls 22 and 24 of the box 12. In this connection, the locking means first described above will be understood to include the side flaps 38 and 40 in cooperation with a pair of side flap receiving openings such as 42 in the side walls 22 and 24 of the box 12.

Figure 4:
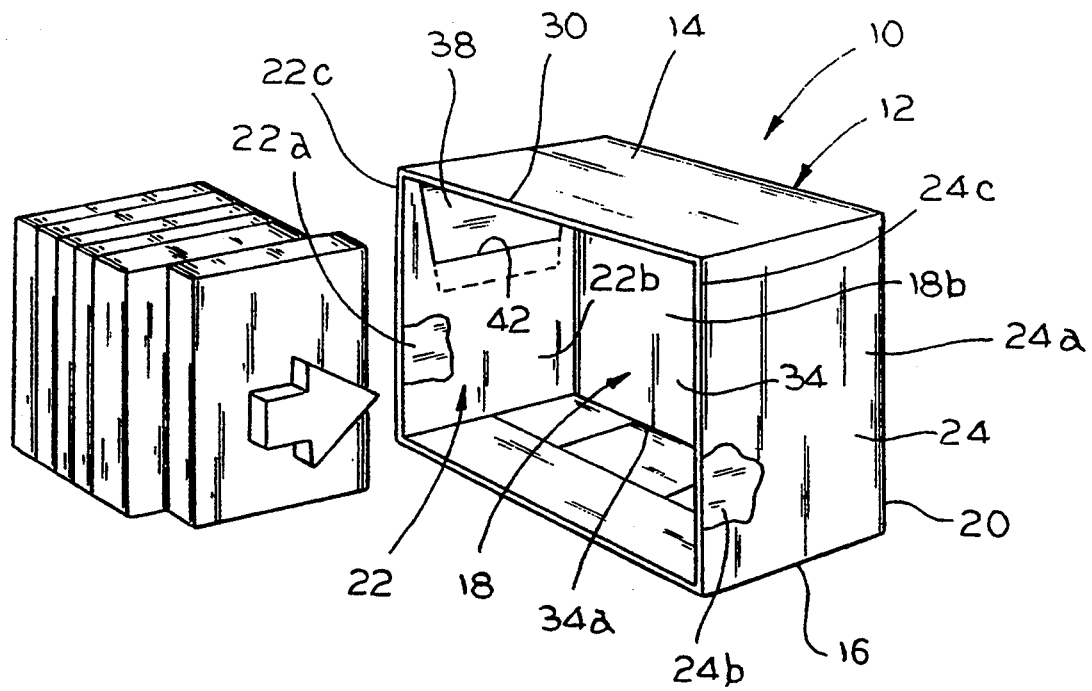
FIG. 4 is a perspective view of the package/shelf organizer of FIG. 1 alter insertion of the cover to form the organizer.
Figure 5:
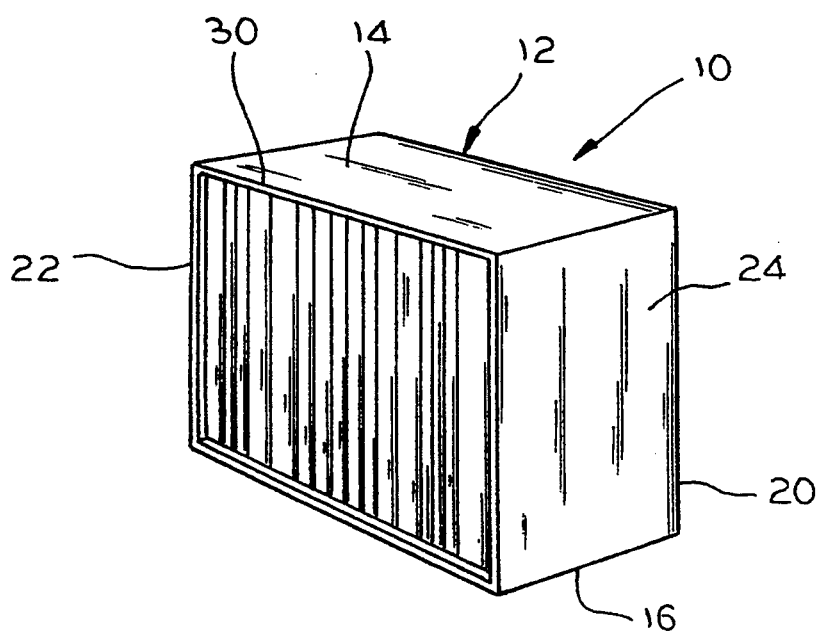
FIG. 5 is a perspective view of the package/shelf organizer of FIG. 1 with the contents visibly displayed in the organizer.

Referring specifically to FIG. 4, at least the side walls 22 and 24 each include an outer wall portion 22a and 24a, respectively, and an inner wall portion 22b and 24b, respectively, with the flap receiving openings such as 42 being formed in the inner wall portions 22b and 24b, respectively. In FIG. 4, it will be seen and appreciated that portions of the inner wall portion 22b and the outer wall portion 24a have been broken away in order to illustrate the dual-thickness nature of the side walls 22 and 24. With this understanding, at least the side walls 22 and 24 are formed with the inner wall portions 22b and 24b of each of the side walls 22 and 24 being integral with the outer wall portions 22a and 24a at respective fold lines 22c and 24c adjacent the respective sides of the cover 18 carrying the side flaps 38 and 40.

Figure 3:
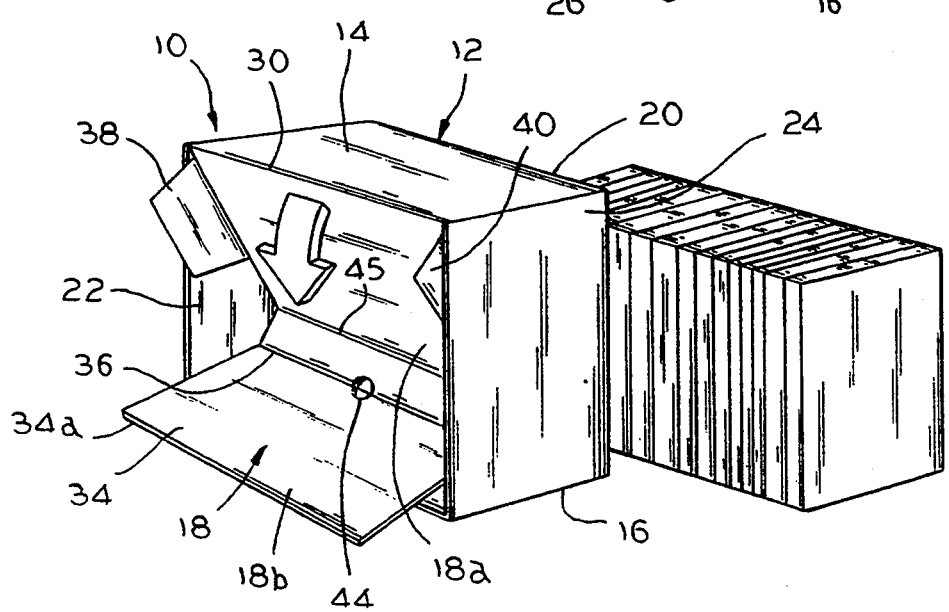
FIG. 3 is a perspective view of the package/shelf organizer of FIG. 1 illustrating insertion of the cover to form the organizer.

Referring specifically to FIGS. 3 and 4, the cover 18 includes a first portion 18a hinged to and generally equal in size to the top wall 14 of the box 12 and a second portion 18b which defines the tuck-in flap 34. As will be appreciated from FIG. 4, the second portion 18b of the cover 18 is effectively hinged to the first portion 18a of the cover 18 and is also formed so as to be generally equal in size to the back wall 20 of the box 12.

Referring once again to FIG. 3, the inner wall portions 22b and 24b of the side walls 22 and 24 each have a generally rectangular cut-out located adjacent the top and back walls 14 and 20 so as to be generally L-shaped. The outer and inner wall portions 22a, 22b and 24a, 24b of each of the side walls 24 are disposed in adjoining relation such that the cut-outs define the flap receiving openings such as 42. In this manner, the side flaps 38 and 40 on the cover 18 will each be understood as sized so as to be lockingly received within one of the flap receiving openings such as 42 which are defined by the cut-outs.

Referring to FIG. 3, the cover 18 may advantageously include a second fold line 44 intermediate of and generally parallel to the fold line 36 forming the tuck-in flap 34 and the fold line 30 where the cover 18 is hinged. This assists in changing the package/organizer 10 from a shipping package (see FIG. 1) to a shelf organizer (see FIG. 5) by facilitating insertion of the cover 18 into the enclosure 26 until the first portion 18a of the cover 18 adjoins or is in abutting contact with the inner surface of the top wall 14 and the second portion 18b of the cover 18 adjoins or is in abutting contact with the inner surface of the back wall 20. After this has been accomplished, i.e., the cover has been folded inwardly (see FIG. 4), the side flaps 38 and 40 are inserted into the respective flap receiving openings such as 42 to complete assembly of the shelf organizer.

Still referring to FIG. 4, it will be seen that the outermost edge 34a of the tuck-in flap 34 is firmly in engagement with the inner surface of the bottom wall 16 of the box 12. This interference fit is accomplished by reason of the fact that the second portion 18b of the cover 18 is generally equal in size to the back wall 20 of the box 12. As a result, the shelf organizer is designed so as to stay in a fully assembled condition during insertion and removal of the contents as they are needed for use by the consumer.

As for other features of the invention, the cover 18 may include a punch-out 44 intermediate opposites sides of the cover 18 along the fold line 36. This punch-out may be achieved by perforating the material which will allow the consumer to create a finger-opening in the cover 18 to facilitate moving the cover 18 from the closed position illustrated in FIG. 1 to the open position illustrated in FIG. 2. In addition, the top wall 14, bottom wall 16, front wall 18, back wall 20, and side walls 22 and 24 are all preferably generally rectangular in shape.

While in the foregoing, there has been set forth a preferred embodiment of the invention, it will be appreciated that the details herein given may be varied by those skilled in the art without departing from the true spirit and scope of the appended claims.

I claim:

1. A convertible package/shelf organizer, comprising:

a generally rectangular box having a top wall, a bottom wall, a front wall, a back wall, and a pair of side walls defining an enclosure for shipping the contents of said box in a normal protected-product fashion, said front wall of said box comprising a cover hinged to one of said top and bottom walls and movable from a closed position concealing and protecting the contents of said box during shipment to an open position providing access for removal of the contents of said box after shipment, said cover being movable to a position entirely within said enclosure juxtaposed against so as to be entirely in abutting contact with an inner surface of the one of said top and bottom walls and an inner surface of said back wall when the contents of said box have been removed;

said cover having an outermost edge adapted to be placed firmly in engagement in interference fit fashion with an inner surface of the other of said top and bottom walls; and means for locking said cover in said juxtaposed position to accommodate replacement of the contents of said box into said box such that the contents are visibly displayed in shelf organizer fashion therewithin.

2. The convertible package/shelf organizer of claim 1 wherein said cover is hinged to said top wall of said box and is of a height greater than the depth of said top wall of said box to define a tuck-in flap.

3. The convertible package/shelf organizer of claim 1 wherein said cover is hinged to said top wall of said box and includes a fold line parallel to where said cover is hinged to define a tuck-in flap.

4. The convertible package/shelf organizer of claim 1 wherein said cover is hinged to said top wall of said box and includes a pair of side flaps hinged to said cover adjacent said side walls of said box.

5. The convertible package/shelf organizer of claim 1 wherein said locking means includes a pair of side flaps hinged to said cover and a pair of side flap receiving openings in said side walls of said box.

6. A convertible package/shelf organizer, comprising:

a generally rectangular box having a top wall, a bottom wall, a front wall, a back wall, and a pair of side walls defining an enclosure for shipping the contents of said box in a normal protected-product fashion, said front wall of said box comprising a cover hinged to one of said top and bottom walls and movable from a closed position concealing and protecting the contents of said box during shipment to an open position providing access for removal of the contents of said box after shipment, said cover being movable to a position entirely within said enclosure juxtaposed against so as to be entirely in abutting contact with an inner surface of the one of said top and bottom walls and an inner surface of said back wall when the contents of said box have been removed;

said cover being of a height greater than the depth of the one of said top and bottom walls of said box to which said cover is hinged to define a tuck-in flap formed by a fold line extending generally parallel to where said cover is hinged;

said cover including a first portion hinged to and generally equal in size to said top wall of said box and a second portion defining said tuck-in flap, said second portion of said cover defining said tuck-in flap being hinged at said fold line and being generally equal in size to said back wall of said box, said tuck-in flap having an outermost edge adapted to be placed firmly in engagement in interference fit fashion with an inner surface of said bottom wall of said box; and means for locking said cover in said juxtaposed position to accommodate replacement of the contents of said box into said box in order to visibly display the contents of said box therewithin, said locking means including a pair of side flaps hinged to said cover on opposite sides thereof and a pair of openings in said side walls of said box to lockingly receive said side flaps therewithin.

7. The convertible package/shelf organizer of claim 6 wherein said cover includes a second fold line intermediate of and generally parallel to said fold line forming said tuck-in flap and where said cover is hinged.

8. The convertible package/shelf organizer of claim 6 wherein at least said side walls each include an outer wall portion and an inner wall portion with said flap receiving opening formed in said inner wall portion.

9. The convertible package/shelf organizer of claim 8 wherein said inner wall portion of each of said side walls is integral with said outer wall portion at a fold line adjacent one of the sides of said cover.

10. The convertible package/shelf organizer of claim 6 wherein said top wall, said bottom wall, said front wall, said back wall, and said pair of side walls of said box are formed to be generally rectangular in shape.

11. A convertible package/shelf organizer, comprising:

a generally rectangular box having a top wall, a bottom wall, a front wall, a back wall, and a pair of side walls defining an enclosure for shipping the contents of said box in a normal protected-product fashion, said front wall of said box comprising a cover hinged to one of said top and bottom walls and movable from a closed position concealing and protecting the contents of said box during shipment to an open position providing access for removal of the contents of said box after shipment, said cover being movable to a position entirely within said enclosure juxtaposed against so as to be entirely in abutting contact with an inner surface of the one of said top and bottom walls and an inner surface of said back wall when the contents of said box have been removed;

said cover including a first portion hinged to and generally equal in size to said top wall of said box and also including a second portion defining a tuck-in flap hinged at a fold line and generally equal in size to said back wall of said box, said tuck-in flap having an outermost edge adapted to be placed firmly in engagement in interference fit fashion with an inner surface of said bottom wall of said box; and means for locking said cover in said juxtaposed position to accommodate replacement of the contents of said box into said box in order to visibly display the contents of said box therewithin, said locking means including a pair of side flaps hinged to said cover on opposite sides thereof and a pair of openings in said side walls of said box to lockingly receive said side flaps therewithin, where at least said side walls each include an outer wall portion and an inner wall portion with said flap receiving openings being formed in said inner wall portions.

12. The convertible package/shelf organizer of claim 11 wherein said inner wall portion of each of said side walls is integral with said outer wall portion at a fold line adjacent one of the sides of said cover.

13. The convertible package/shelf organizer of claim 11 wherein said inner wall portion of each of said side walls has a generally rectangular cut-out located adjacent said top and back walls to be generally L-shaped.

14. The convertible package/shelf organizer of claim 13 wherein said inner and outer wall portions of each of said side walls are disposed in adjoining relation such that said cut-out defines said flap receiving opening.

15. The convertible package/shelf organizer of claim 14 wherein said side flaps on said cover are each sized to be lockingly received within one of said flap receiving openings defined by said cut-outs.

16. The convertible package/shelf organizer of claim 11 wherein said top wall, said bottom wall, said front wall, said back wall, and said pair of said walls of said box are formed to be generally rectangular in shape.

* * * * *

UNITED STATES PATENT AND TRADEMARK OFFICE
CERTIFICATE OF CORRECTION

PATENT NO. : 5,381,890

DATED : January 17, 1995

INVENTOR(S) : SCOBBIE, Gavin

It is certified that error appears in the above-identified patent and that said Letters Patent is hereby corrected as shown below:

column 3, line 5, replace "alter" with --after--; and column 5, line 27, replace "wail" with --wall--.

Signed and Sealed this

Twenty-fifth Day of April, 1995

Attest:

BRUCE LEHMAN

*Attesting Officer*        *Commissioner of Patents and Trademarks*